United States Patent [19]

Malfroid et al.

[11] Patent Number: 4,889,892
[45] Date of Patent: Dec. 26, 1989

[54] FLEXIBLE COMPOSITIONS BASED ON VINYL CHLORIDE POLYMERS COMPRISING POLY-ε-CAPROLACTONE

[75] Inventors: Pierre Malfroid, Grez-Doiceau; Qui Long Nguyen, Liege; Jean-Marie Blondin; Jean-Paul Burnay, both of Brussels, all of Belgium

[73] Assignee: Solvay & Cie, Belgium

[21] Appl. No.: 221,329

[22] Filed: Jul. 19, 1988

[30] Foreign Application Priority Data

Jul. 24, 1987 [FR] France ................................ 87 10613

[51] Int. Cl.$^4$ ........................ C08L 27/06; C08L 31/00
[52] U.S. Cl. ...................................... 525/186; 525/190
[58] Field of Search ................................ 525/186, 190

[56] References Cited

U.S. PATENT DOCUMENTS

| | | | |
|---|---|---|---|
| 3,169,945 | 2/1965 | Hostettler et al. | 260/78.3 |
| 3,798,289 | 3/1974 | McGrath et al. | 260/895 |
| 4,489,193 | 12/1984 | Goswami | 525/190 |

FOREIGN PATENT DOCUMENTS

| | | |
|---|---|---|
| 1123645 | 11/1984 | Japan . |
| 1000402 | 7/1971 | United Kingdom . |

*Primary Examiner*—John C. Bleutge
*Assistant Examiner*—Susan Berman
*Attorney, Agent, or Firm*—Stevens, Davis, Miller & Mosher

[57] ABSTRACT

The compositions contain, as vinyl chloride polymers, copolymers of vinyl chloride and of alkyl acrylates in which the alkyl radicals, consisting of linear or branched chains, contain from 1 to 10 carbon atoms and have an initial Shore A hardness not exceeding 85. They are suitable for the production of very diverse flexible articles, especially in the medical field (pouches for blood and for physiological fluids), the motor vehicle field (various profiles and seals) and the building industry (sealing sheets).

8 Claims, No Drawings

FLEXIBLE COMPOSITIONS BASED ON VINYL CHLORIDE POLYMERS COMPRISING POLY-ε-CAPROLACTONE

The present invention relates to flexible compositions based on vinyl chloride polymers comprising poly-ε-caprolactone. It relates more particularly to such compositions whose initial Shore A hardness does not exceed 85.

Flexible, that is to say plasticized, compositions based on polyvinyl chloride find many applications in fields as diverse as the medical field, the motor vehicle field and the building industry. In a large number of these applications, nonmigrating plasticizers and, in particular, polymeric plasticizers, such as, for example, poly-ε-caprolactone, are resorted to. Nevertheless, it is known that poly-ε-caprolactone tends to crystallize within the polyvinyl chloride, and that this tendency increases with the concentration of poly-ε-caprolactone in the mixture. This crystallization results in a loss of flexibility with time and of transparency of objects fabricated using mixtures of polyvinyl chloride and poly-ε-caprolactone. It has been verified that above a concentration of approximately 35% by weight of poly-ε-caprolactone in such mixtures—whose initial Shore A hardness lies in the region of 86—it is no longer possible to obtain a stable flexibility. A stable flexibility means a change of less than 5 in the Shore A hardness after two months' storage at ambient temperature. The use of flexible compositions based on polyvinyl chloride and poly-ε-caprolactone is therefore limited in practice to the fields in which a maximum flexibility corresponding to an initial Shore A hardness of approximately 86 suffices.

The objective of the present invention is to provide compositions based on vinyl chloride polymers and on poly-ε-caprolactone which do not exhibit the above-mentioned disadvantages. To this end, the invention as characterized in the claims provides compositions whose initial Shore A hardness does not exceed 85 and whose flexibility is stable.

A surprising effect of the present invention lies in the fact that resorting to copolymers of vinyl chloride and of alkyl acrylates makes it possible to attain high flexibility levels which are stable with time, which it is impossible to attain with the compositions of the prior art, based on polyvinyl chloride and poly-ε-caprolactone.

Copolymers of vinyl chloride and of alkyl acrylates are intended to denote the copolymers containing not more than 50% by weight of monomer units derived from alkyl acrylates whose alkyl radicals, consisting of linear or branched chains, contain from 1 to 10 carbon atoms.

Preference is given to the copolymers of vinyl chloride containing 5 to 45% by weight of monomer units derived from alkyl acrylates and more particularly still to those containing from 15 to 35% by weight of such monomer units. It is obvious that the copolymer may contain one or more alkyl acrylates. It is also obvious that the copolymer may contain small quantities, up to approximately 5% by weight, of another vinyl monomer chosen, preferably, from vinyl monomers which are less reactive than vinyl chloride. By way of example of such copolymers there may be mentioned copolymers of vinyl chloride and of alkyl acrylates containing up to 5% by weight of vinyl acetate. Nevertheless, preference is given to binary copolymers of vinyl chloride and of an alkyl acrylate.

Insofar as the alkyl acrylates are concerned, preference is given to alkyl acrylates whose alkyl radicals, consisting of linear or branched chains, contain from 3 to 9 carbon atoms and more particularly still from 4 to 8 carbon atoms. A very particularly preferred alkyl acrylate is 2-ethylhexyl acrylate.

The copolymers of vinyl chloride and of alkyl acrylates may be obtained by any of the usual polymerization techniques and, in particular, by those where the monomers are dispersed with the aid of dispersing or emulsifying agents in an aqueous polymerization medium. Nevertheless, preference is given to the copolymers obtained by polymerization in aqueous suspension. Furthermore, preference is given to the homogeneous copolymers obtained by a delayed injection of the alkyl acrylates, which are more reactive than vinyl chloride.

Consequently, vinyl chloride polymers which are particularly preferred for producing flexible compositions according to the invention are the homogeneous binary copolymers of vinyl chloride and of an alkyl acrylate in which the alkyl radicals, consisting of linear or branched chains, contain from 4 to 8 carbon atoms. Copolymers which are very particularly preferred are the homogeneous binary copolymers of vinyl chloride and of 2-ethylhexyl acrylate.

The flexibility of the compositions according to the invention depends, on the one hand, on the nature of the copolymer (and varies as a function of its content of alkyl acrylate and on the nature of the latter) and, on the other hand, on the poly-ε-caprolactone content.

The minimum concentration of poly-ε-caprolactone in the compositions according to the invention, that is to say that imparting to the compositions a flexibility which corresponds to an initial Shore A hardness of 85 (minimum flexibility) may be readily determined experimentally for each given copolymer of vinyl chloride. All the compositions according to the invention exhibiting an initial Shore A hardness of 85 exhibit a stable flexibility such as defined above.

The maximum molar concentration of poly-ε-caprolactone in the compositions according to the invention which provides a maximum flexibility which is always stable is defined, furthermore, by the following formula:

$$\ln x_{PCL} = -1{,}48 - \frac{163 + 160(n-1)}{86 + 14(n-1)} \cdot x_{ACR}$$

in which:
  $x_{PCL}$ denotes the maximum molar fraction, in monomer units of poly-ε-caprolactone (PCL), in the mixture of PCL plus vinyl chloride copolymer,
  $x_{ACR}$ denotes the molar fraction of alkyl acrylate in the vinyl chloride copolymer, and
  denotes the number of carbon atoms in the alkyl radical of the alkyl acrylate.

It is obvious that the compositions according to the invention may contain all the usual ingredients employed for the fabrication of flexible compositions based on vinyl chloride polymers, such as lubricants, processing aids, fillers, pigments or rubbers, such as, for example, nitrile rubbers intended to improve the flexibility of the compositions at very low temperatures and to reduce their set.

Mixing of poly-ε-caprolactone with the vinyl chloride copolymer presents no special problem. They may be mixed, for example, at the time when the premix is manufactured. The vinyl chloride and the alkyl acrylate and, where appropriate, the other vinyl monomer may also be copolymerized in the presence of preformed poly-ε-caprolactone and the usual premix ingredients may be subsequently incorporated therein.

The compositions according to the invention offer the advantage of gelling more easily than the known compositions based on polyvinyl chloride and poly-ε-caprolactone. Furthermore, they are much more flexible at the same content of poly-ε-caprolactone and make it possible to attain very high stable flexibility levels which it is not possible to attain with the known compositions.

The compositions according to the invention may be fabricated by all the usual methods for fabricating flexible compositions based on vinyl chloride polymers such as, for example, injection moulding, calendering or extrusion. They are suitable for the manufacture of flexible objects which can be employed in fields as diverse as the medical field (pouches for blood and for physiological fluids), the motor vehicle field (various profiles and seals) or else the building industry (sealing sheets).

The examples which follow illustrate the invention. Examples 1 to 6, according to the invention, relate to compositions based on homogeneous binary copolymers of vinyl chloride and of methyl (Example 1), n-butyl (Examples 2 and 3) and 2-ethylhexyl (Examples 4, 5 and 6) acrylates. Example 7, according to the invention, relates to a composition based on a copolymer of vinyl chloride and of 2-ethylhexyl acrylate containing 2.5% by weight of vinyl acetate. In Examples 1 to 5, the maximum quantity of poly-ε-caprolactone resulting in a maximum flexibility stable with time has been employed.

Examples 8, 9 and 10, for comparison, relate to compositions based on polyvinyl chloride and on poly-ε-caprolactone containing variable quantities of poly-ε-caprolactone.

In all the examples, the poly-ε-caprolactone employed is an essentially linear, granular poly-ε-caprolactone with a molecular weight of approximately 50,000, produced and marketed by Interox under the trademark CAPA (650 grade).

The viscosity numbers (I.V.) of the homogeneous copolymers of vinyl chloride and of alkyl acrylates, employed in Examples 1 to 7, measured according to ISO standard 174-1961, appear in Table I, appended.

The viscosity number of the polyvinyl chloride employed in the Comparative Examples 8 to 10 is 82.4.

In Examples 1 to 10, crepes were prepared by compounding for four minutes at 160° C. 143 g of a mixture of a vinyl chloride polymer and of poly-ε-caprolactone, 3 g of heat stabilizer, (tin dioctyl dithioglycolate), 1.5 g of processing aid (methyl methacrylate/styrene/acrylonitrile polymer) and 0.2 g of lubricant (polyethylene wax).

The crepes thus obtained were used for pressing plates by preheating the crepes to 165° C. for 2 min 30 s, followed by a pressing for 1 min at 165° C. at a pressure of 6,865 kPa.

The Shore A hardness was measured on these plates according to French Standard NF T 51-109 (temperature 23° C.±2; relative humidity 50±5%).

Equivalent standards which can also be employed to evaluate Shore A hardness are ASTM D 2240, DIN 53 505 and ISO 868.

Table I, appended, shows the molar and weight composition of the vinyl chloride (VC) copolymer/poly-ε-caprolactone mixtures, the molar and weight content of the alkyl acrylate copolymers and, lastly, the initial Shore A hardness and that measured after two months' storage at ambient temperature of the compositions according to Examples 1 to 7.

Table II, appended, shows the weight proportions of polyvinyl chloride and of poly-ε-caprolactone, together with the initial Shore A hardness and that measured after two months' storage at ambient temperature of the compositions according to the Comparative Examples 8 to 10.

TABLE I

| No. of example | Composition of the vinyl chloride (VC) copolymer | | | | Composition of the mixture | | | | Shore A hardness at 23° C. | |
|---|---|---|---|---|---|---|---|---|---|---|
| | Nature of acrylate | Acrylate content | | | VC copoly. | | Poly-caprolact. | | initial | after 2 months |
| | | % weight | % mol | I.V. | % weight | % mol | % weight | % mol | | |
| 1 | methyl acrylate | 30 | 23.7 | 162 | 78 | 85.6 | 22 | 14.4 | 82 | 84 |
| 2 | n-butyl acrylate | 25 | 14 | 148 | 82 | 87.9 | 18 | 12.1 | 72 | 74 |
| 3 | n-butyl acrylate | 30 | 17.3 | 164 | 86 | 90.5 | 14 | 9.5 | 68 | 72 |
| 4 | 2-ethylhexyl acrylate | 18 | 7 | 125 | 80 | 86.5 | 20 | 13.5 | 80 | 84 |
| 5 | 2-ethylhexyl acrylate | 30 | 12.7 | 153 | 87 | 90.7 | 13 | 9.3 | 65 | 67 |
| 6 | 2-ethylhexyl acrylate | 30 | 12.7 | 153 | 92 | 94.4 | 8 | 5.6 | 80 | 81 |
| 7 | 2-ethylhexyl acrylate | 27.5 | 11.5 | 130 | 87 | 90.8 | 13 | 9.2 | 69 | 71 |

TABLE II

| Example No. | Composition of the mixture % by weight | | Shore hardness A | |
|---|---|---|---|---|
| | Polyvinyl chloride | Poly-ε-caprolactone | initial | after 2 months |
| 8 | 64 | 36 | 82 | 87 |
| 9 | 63 | 37 | 81 | 88 |
| 10 | 62 | 38 | 79 | 90 |

We claim:

1. Flexible compositions based on vinyl chloride polymers and on poly-ε-caprolactone, consisting essentially of vinyl chloride polymers chosen from the copolymers of vinyl chloride and of alkyl acrylates in which the alkyl radicals consist of linear or branched chains containing from 1 to 10 carbon atoms and of poly-ε-caprolactone wherein the initial Shore A hardness of the compositions does not exceed 85.

2. The flexible compositions based on vinyl chloride polymers and on poly-ε-caprolactone according to claim 1, wherein the vinyl chloride copolymers contain from 5 to 45% by weight of monomer units derived from alkyl acrylates.

3. The flexible compositions based on vinyl chloride polymers and on poly-ε-caprolactone according to claim 2, wherein the vinyl chloride copolymers contain from 15 to 35% by weight of monomer units derived from alkyl acrylates.

4. The flexible compositions based on vinyl chloride polymers and on poly-ε-caprolactone according to claim 1 wherein the vinyl chloride copolymers contain up to 5% by weight of vinyl acetate.

5. The flexible compositions based on vinyl chloride polymers and on poly-ε-caprolactone according to claim 1, wherein the alkyl radicals of the alkyl acrylates contain from 3 to 9 carbon atoms.

6. The flexible compositions based on vinyl chloride polymers and on poly-ε-caprolactone according to claim 5, wherein the alkyl radicals of the alkyl acrylates contain from 4 to 8 carbon atoms.

7. The flexible compositions based on vinyl chloride polymers and on poly-ε-caprolactone according to claim 1, wherein the vinyl chloride polymers are homogeneous binary copolymers of vinyl chloride and of alkyl acrylates in which the alkyl radicals contain from 4 to 8 carbon atoms.

8. The flexible compositions based on vinyl chloride polymers and on poly-ε-caprolactone according to claim 1, wherein the maximum molar concentration of poly-ε-caprolactone in the compositions is defined by the following formula:

$$\ln x_{PCL} = -1{,}48 - \frac{163 + 160\,(n-1)}{86 + 14\,(n-1)} \cdot x_{ACR}$$

in which:

in which:
- $x_{PCL}$ denotes the maximum molar fraction, in monomer units of poly-ε-caprolactone (PCL), in the mixture of PCL plus vinyl chloride copolymer,
- $x_{ACR}$ denotes the molar fraction of alkyl acrylate in the vinyl chloride copolymer, and
- n denotes the number of carbon atoms in the alkyl radical of the alkyl acrylate.

* * * * *